United States Patent
Rogers

[19]

[11] Patent Number: 6,061,735
[45] Date of Patent: May 9, 2000

[54] NETWORK RESTORATION PLAN REGENERATION RESPONSIVE TO NETWORK TOPOLOGY CHANGES

[75] Inventor: James David Rogers, Larkspur, Colo.

[73] Assignee: MCI Communications Corporation, Washington, D.C.

[21] Appl. No.: 08/956,314

[22] Filed: Oct. 23, 1997

[51] Int. Cl.[7] .......................... G06F 15/173; G06F 11/00
[52] U.S. Cl. .......................... 709/239; 370/221; 370/225
[58] Field of Search ............................ 709/239; 370/221, 370/225

[56] References Cited

U.S. PATENT DOCUMENTS

| | | | |
|---|---|---|---|
| 5,435,003 | 7/1995 | Chng et al. | 395/575 |
| 5,444,693 | 8/1995 | Arslan et al. | 370/16 |
| 5,680,326 | 10/1997 | Russ et al. | |
| 5,689,646 | 11/1997 | Thorson | 709/239 |
| 5,812,524 | 9/1998 | Moran et al. | 370/228 |
| 5,832,196 | 11/1998 | Croslin et al. | 395/182.02 |
| 5,832,197 | 11/1998 | Houji | 395/182.02 |
| 5,835,482 | 11/1998 | Allen | 370/225 |
| 5,859,959 | 1/1999 | Kimball et al. | 395/182.02 |
| 5,884,046 | 3/1999 | Antonov | 709/238 |
| 5,892,923 | 4/1999 | Yasuda et al. | 709/239 |
| 5,914,798 | 6/1999 | Liu | 359/161 |

*Primary Examiner*—Krisna Lim

[57] ABSTRACT

An improved network restoration system is provided that generates restoration plans responsive to topology changes in the network. The improved network restoration system detects when a topology change occurs in the network and then uses the most up-to-date topology information to regenerate only those restoration plans that are affected by the topology change. By regenerating the affected restoration plans responsive to topology changes instead of continually regenerating all plans like in conventional systems, the improved network restoration system saves significant processing time. Additionally, regenerating the affected restoration plans responsive to topology changes ensures that the restoration plans are always valid and reflect the most up-to-date topology information for the network. When detecting that a topology change has occurred, the improved network restoration system applies a user-defined threshold to determine whether the restoration plans should be regenerated. This threshold may be based on the number of network topology changes, the number of restoration plans affected by the topology changes, or the number of instructions within the restoration plans that are affected by the topology changes.

24 Claims, 5 Drawing Sheets

NETWORK RESTORATION PLAN REGENERATION RESPONSIVE TO NETWORK TOPOLOGY CHANGES

TECHNICAL FIELD

The present invention relates generally to data processing systems and, more particularly, to network restoration plan regeneration that is responsive to network topology changes.

BACKGROUND OF THE INVENTION

Communications networks sometimes experience network failures. For example, either a network node, such as a digital cross-connect switch (DXC), may fail or a trunk, like a fiber optic cable, that connects two nodes may fail. Such network failures may result from a variety of circumstances, including mechanical failure, operator error, or environmental conditions, like an earthquake, which may render a network component inoperable.

To quickly reroute the network traffic around a network failure, network restoration systems have been developed. These systems generate restoration plans ("plans") which contain instructions for rerouting network traffic around a network failure. This rerouting around a network failure is sometimes referred to as "restoring the network." By pre-planning network restoration, the time necessary for rerouting network traffic is greatly reduced, which lessens the negative impact of a network failure on network traffic. For example, FIG. 1 depicts a network 100 comprising nodes 102–106 and trunks 108–112, which interconnect the nodes. With respect to the network 100, a plan for the failure of trunk 112, which prevents the direct transfer of traffic from node A to node C, may be as follows: (1) disconnect node A and node C, (2) connect node A with node B such that traffic may be transferred over trunk 108, and (3) connect node B with node C such that traffic may be transferred over trunk 110. "Connecting two nodes" refers to either automatically or manually indicating to the two nodes that they may communicate with each other over the trunk that interconnects the nodes. After two nodes have received such an indication, each node expects to receive data from the other, and each node is prepared to negotiate to exchange data using a predesignated protocol. When two nodes are disconnected either manually or automatically, the nodes no longer attempt to exchange data over the trunk that interconnects the nodes. Once this example plan has been implemented, network traffic will circumvent the failed trunk 112 and will instead be routed between nodes A and node C via node B, so that devices connected to node A can communicate with devices connected to node B.

Conventional network restoration systems create plans to prepare for a trunk failure, a node failure, or a network failure that will affect a number of trunks and nodes. These network restoration systems create plans for a particular failure (e.g., a trunk) by first examining the available spare network segments that may be used to route traffic around the failed trunk. A network segment is a path in the network formed by one or more contiguous trunks and the nodes that interconnect those trunks. Many networks, such as the public telephone network, have two types of network segments: a traffic segment, which is a network segment used for traffic during normal operations of the network, and a spare segment, which is a segment not typically used for network traffic during normal operations of the network, but which is instead used in the event of a network failure to circumvent traffic around the network component that failed. After examining the available spare network segments, the network restoration system selects the best spare segment based on a number of factors, including which spare segment spans the shortest distance, which spare segment has the greatest bandwidth, and which spare segment has the least amount of network traffic.

Conventional network restoration systems continually update the plans for a network to ensure that the plans are current. That is, for each node and trunk in the network, the network restoration system generates a plan for that network component, and when it is completed with all of the network components, the network restoration system immediately starts over again. Although in a small network this continual regeneration may be acceptable, for a large network, like the public telephone network, there may be between 800 and 1500 plans in existence at any given time, which may require up to three days to regenerate. During this three-day time frame, the topology of the network may change, and a number of the plans may become ineffective to reroute traffic around a network failure because, for example, the topology change may have removed a network component which was part of the plan. Additionally, this continuous update of the plans places an enormous burden on the resources of the network restoration system. It is therefore desirable to improve network restoration systems.

SUMMARY OF THE INVENTION

An improved network restoration system is provided that generates restoration plans responsive to topology changes in the network. The improved network restoration system detects when a topology change occurs in the network and then uses the most up-to-date topology information to regenerate only those restoration plans that are affected by the topology change. By regenerating the affected restoration plans responsive to topology changes instead of continually regenerating all plans like in conventional systems, the improved network restoration system saves significant processing time. Additionally, regenerating the affected restoration plans responsive to topology changes ensures that the restoration plans are always valid and reflect the most up-to-date topology information for the network. When detecting that a topology change has occurred, the improved network restoration system applies a user-defined threshold to determine whether the restoration plans should be regenerated. This threshold may be based on the number of network topology changes, the number of restoration plans affected by the topology changes, or the number of instructions within the restoration plans that are affected by the topology changes.

In accordance with a first aspect of the present invention, a method is provided in a data processing system having a network restoration system with plans for rerouting traffic in a network around a network failure. In accordance with this method, the network restoration system determines whether a topology of the network has changed, and when it is determined that the topology has changed, the network restoration system regenerates at least one of the plans responsive to the determination that the topology of the network has changed.

In accordance with a second aspect of the present invention, a data processing system for managing restoration of a network having a topology is provided. The data processing system comprises a secondary storage device containing a plurality of plans for use in rerouting network traffic when a network failure occurs and a topology database containing topology information indicating the topology of the network. Additionally, the data processing system comprises a memory containing an update manager for determining when the topology of the network has changed and a restoration manager. The restoration manager receives an indication that the topology of the network has changed from the update manager, determines which of the plans are affected by the topology change, and regenerates the affected plans utilizing the topology information in the topology database. The data processing system also contains a processor for running the update manager and the restoration manager.

DETAILED DESCRIPTION OF THE INVENTION

An exemplary embodiment of the present invention provides an improved network restoration system that generates plans responsive to network topology changes. When a network topology change occurs, the improved network restoration system regenerates only those plans that are affected by the topology change and regenerates these plans using the most up-to-date topology information. By regenerating only the plans that are affected by the topology change, the improved network restoration system saves significant processing time over conventional network restoration systems, and by regenerating these plans using the most up-to-date topology information, the plans are ensured to be valid for the current topology. Additionally, the improved network restoration system of the exemplary embodiment utilizes a threshold so that plan regeneration does not occur upon every topology change, but rather occurs after the number of topology changes exceeds a user-defined threshold, thus saving significant processing time.

Figure 1:
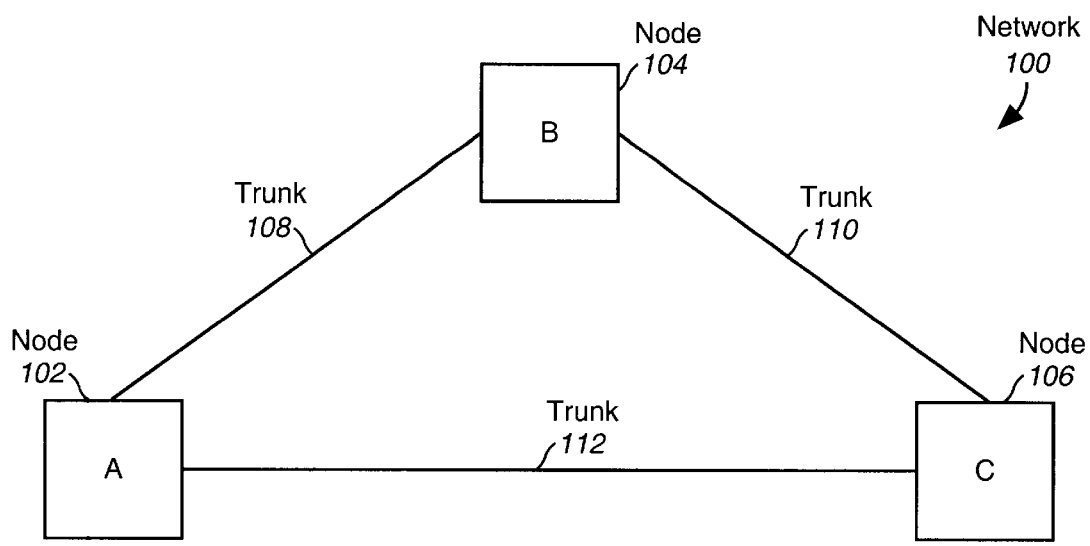
FIG. 1 depicts a conventional network containing nodes and trunks.
Figure 2:
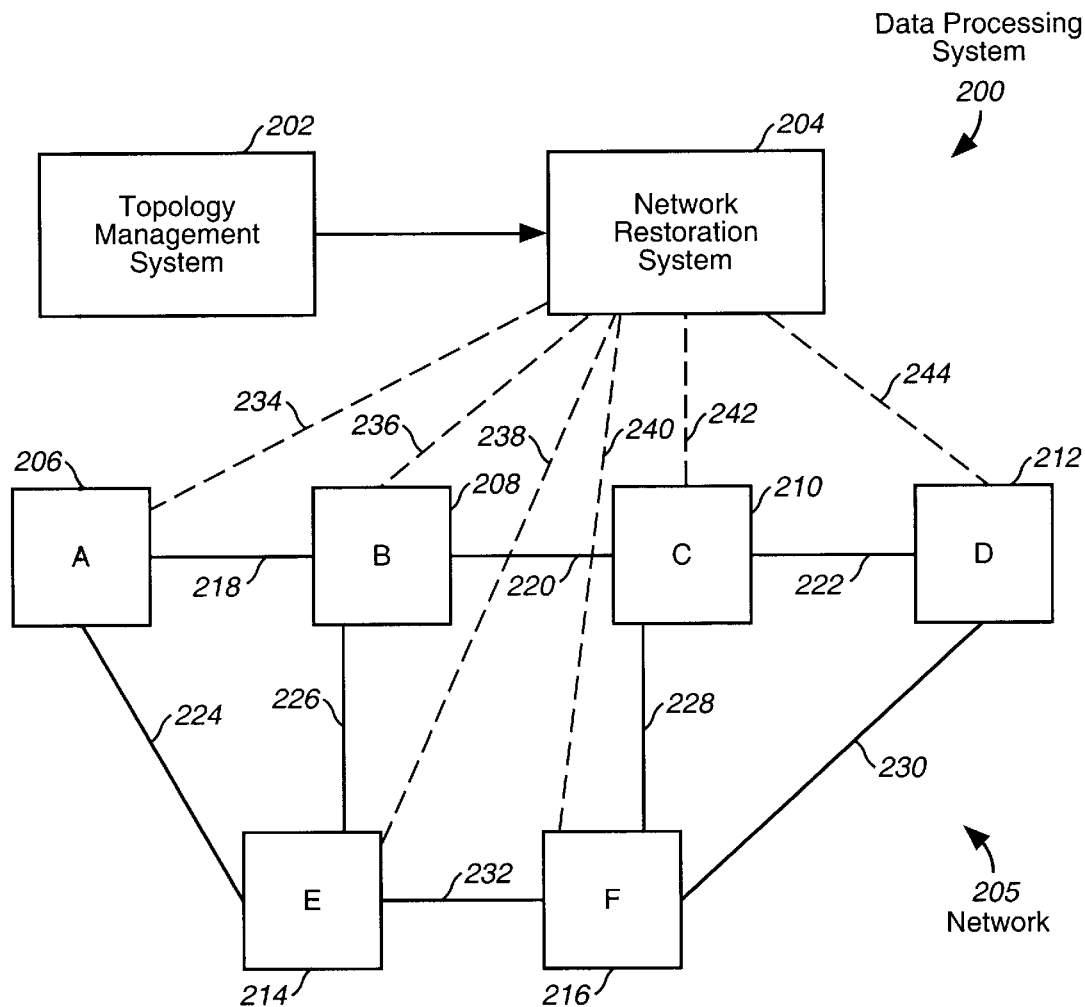
FIG. 2 depicts a data processing system that is suitable for practicing an exemplary embodiment of the present invention.

FIG. 2 depicts a data processing system 200 that is suitable for practicing an exemplary embodiment of the present invention. The data processing system 200 comprises a topology management system 202, a network restoration system 204, and a network 205. The topology management system 202 contains current topology information for the network 205 and notifies the network restoration system 204 when a topology change has occurred. The network restoration system 204 is responsible for generating plans to reroute traffic around a network failure as well as implementing the plan when a network failure occurs by issuing the instructions in the plan via X.25 connections 234–244. The network 205 comprises a number of nodes 206–216, such as DXCs, which are interconnected via trunks 218–232, such as fiber optic cables.

Figure 3:
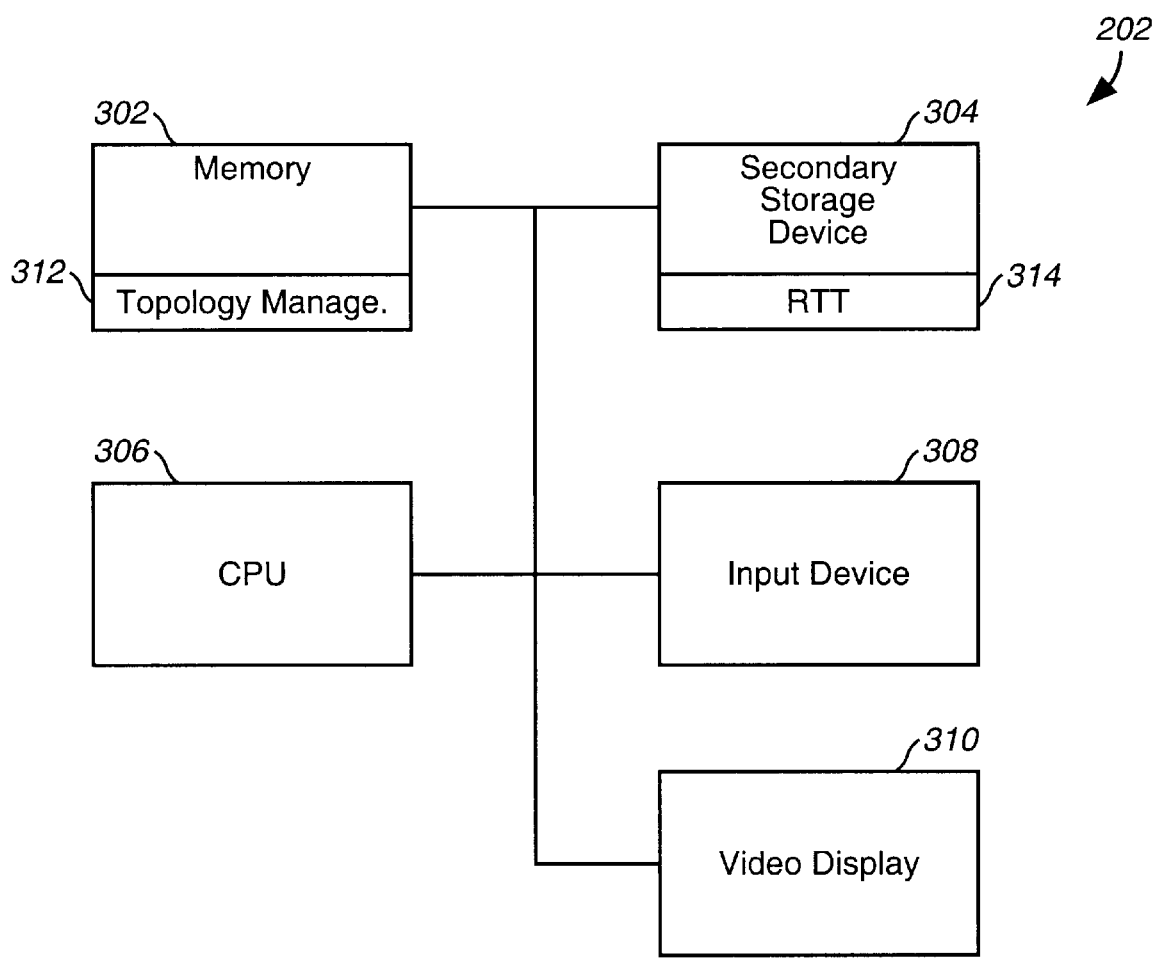
FIG. 3 depicts a more detailed diagram of the topology management system depicted in FIG. 2.

FIG. 3 depicts a more detailed diagram of the topology management system 202 of an exemplary embodiment of the present invention. The topology management system 202 contains a memory 302, a secondary storage device 304, a central processing unit (CPU) 306, an input device 308, and a video display 310. The memory 302 contains a topology manager program 312, which manages the real-time topology database (RTT) 314 on the secondary storage device 304. The RTT 314 is a database containing records which indicate the current topology of the network. For example, a record for a particular trunk indicates the nodes that it interconnects. Additionally, the RTT 314 contains records for network segments, which contain a number of contiguous trunks and nodes that form a path. The topology manager 312 is responsible for sending an indication to the network restoration system 204 when the RTT 314 is updated. In an exemplary embodiment, when a topology change occurs, the network administrator updates the RTT 314 to reflect the change. The network administrator knows of the change because he was involved in making it. The topology manager program 312 detects this update and then notifies the network restoration system 204 of the topology change. Although the RTT 314 is depicted as being stored on a computer that is separate from the network restoration system 204, one skilled in the art will appreciate that the RTT may alternatively be stored on the secondary storage device of the network restoration system.

Figure 4:
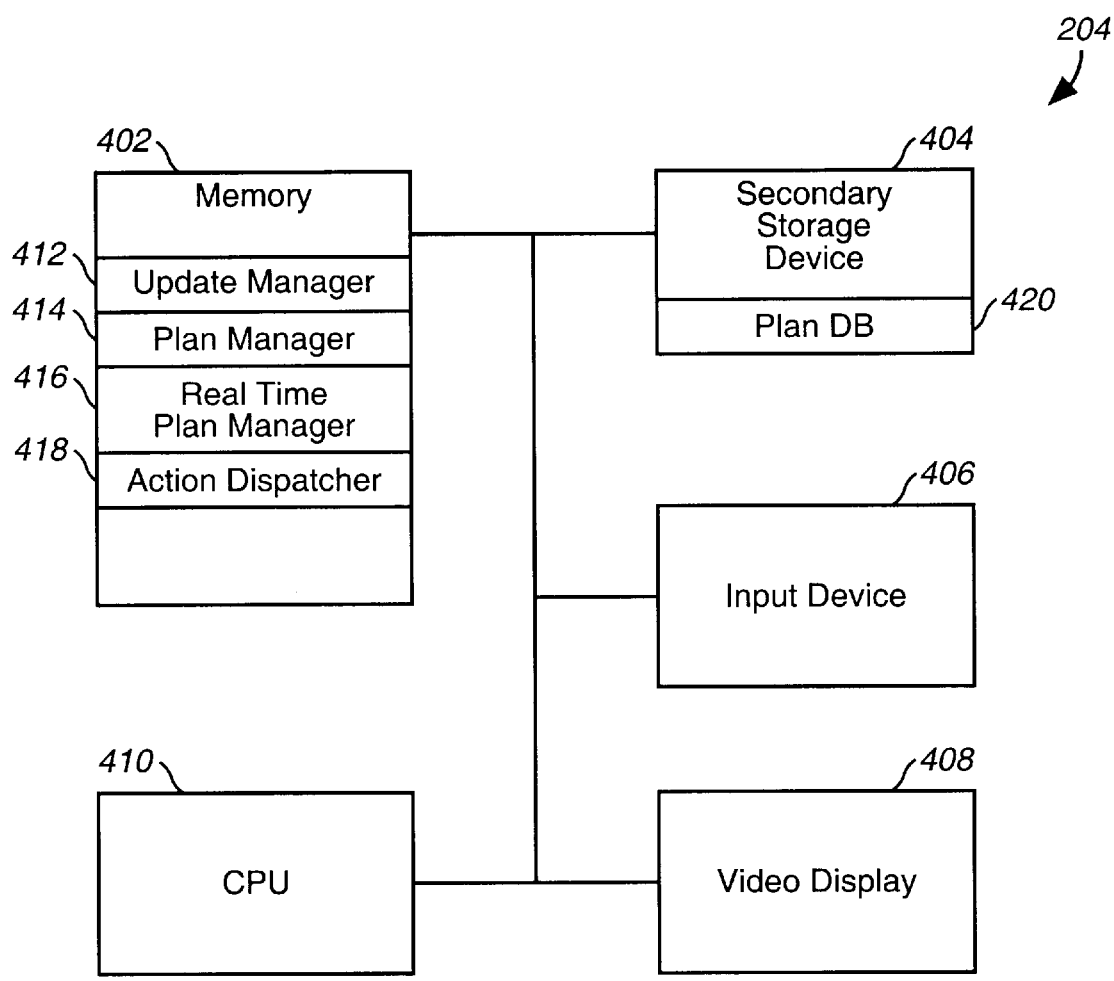
FIG. 4 depicts a more detailed diagram of the network restoration system depicted in FIG. 2.

FIG. 4 depicts a more detailed diagram of the network restoration system 204 of an exemplary embodiment of the present invention. The network restoration system 204 contains a memory 402, a secondary storage device 404, an input device 406, a video display 408, and a CPU 410. The memory 402 contains an update manager 412, a plan manager 414, a real-time plan generator 416, and an action dispatcher 418. The secondary storage device 404 contains a plan database 420, which contains all of the plans used for restoring the network from a network failure. The update manager 412 receives a notification from the topology manager 312 when the RTT 314 has been updated to reflect a network topology change. The plan manager 414 is responsible for performing restoration. Specifically, when a network failure occurs, the plan manager 414 implements a plan by accessing the plan database 420 to obtain the plan for the network component that failed and by passing this plan to the action dispatcher 418, which then issues the instructions contained within the plan to the nodes in the network via the X.25 connections. One skilled in the art will appreciate that, upon receiving an instruction, the node may automatically implement the instruction (e.g., perform a connect), or alternatively, the instruction may be sent to the network administrator for manual implementation. The real-time plan generator 416 is responsible for receiving topology changes from the update manager 412, determining which plans are affected by the topology changes, and then regenerating the affected plans using the most up-to-date topology information contained in the RTT 314. A plan is "affected" by a topology change when either a network component that is part of the plan becomes unavailable due to the topology change or the topology change yields a better choice of a network segment for rerouting traffic around a failed network component. The network restoration system in which an exemplary embodiment operates is further described in copending U.S. patent application Ser. No. 08/775,553, entitled "Method and Apparatus for Identifying Restoral Routes in a Network" and copending U.S. patent application Ser. No. 08/753,558, entitled "Method and Apparatus for Deriving and Representing Physical Network Topology," which are both hereby incorporated by reference.

Figure 5:
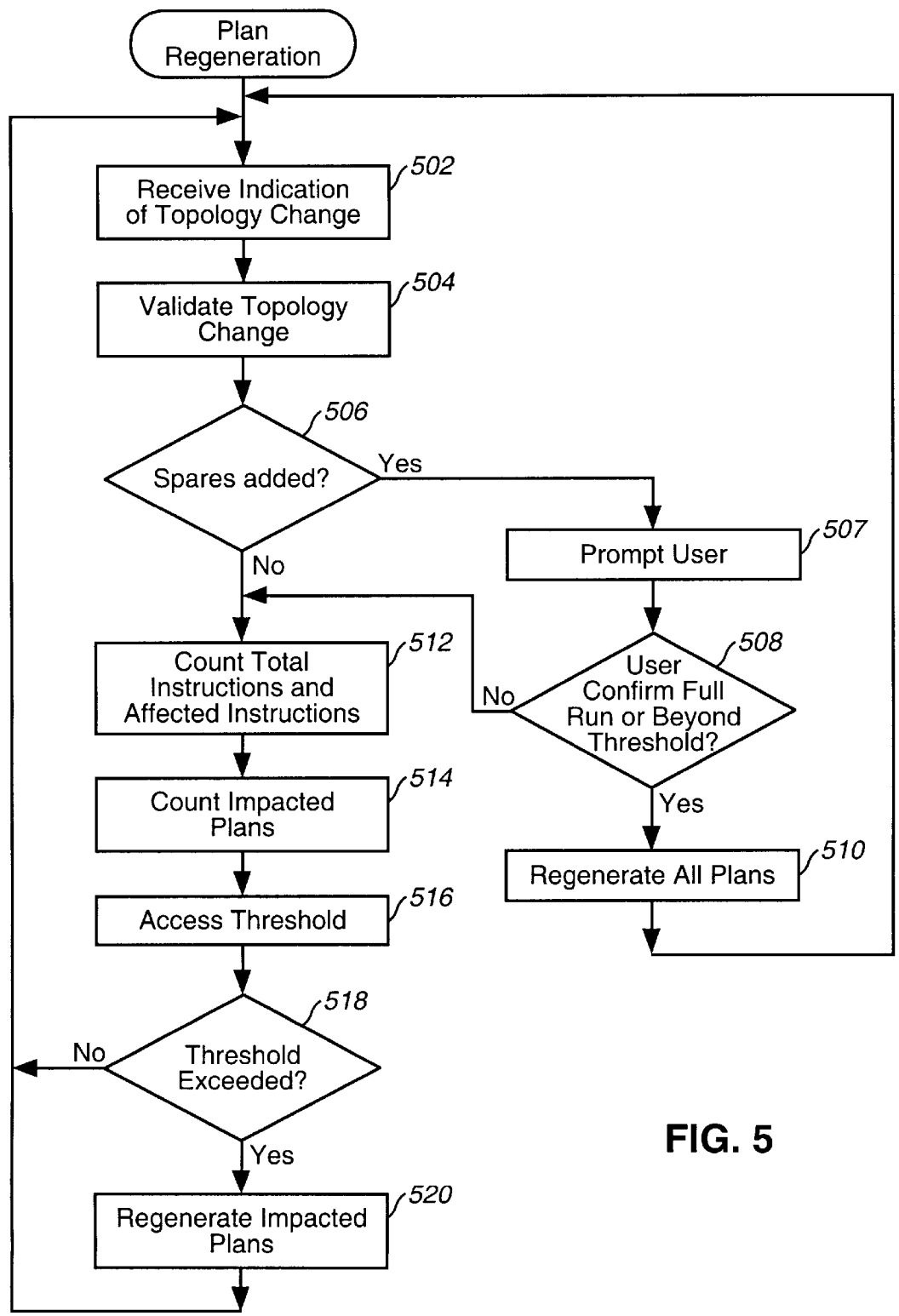
FIG. 5 depicts a flowchart of the steps performed during plan regeneration of an exemplary embodiment of the present invention.

FIG. 5 depicts a flowchart of the steps performed by an exemplary embodiment during plan regeneration. This flowchart reflects steps performed by both the update manager and the real-time plan generator. The first step performed during plan regeneration is that the update manager receives an indication of a topology change from the topology manager (step 502). The types of topology changes that may occur include adding a spare segment, deleting a spare segment, adding a traffic segment, or deleting a traffic segment. Adding a spare segment includes adding a new network segment to the network or redesignating a segment previously designated for traffic as a spare. Deleting a spare segment includes removing a spare network segment from the network or designating a segment previously used for traffic as a spare. Adding a traffic segment includes adding a network segment that is designated for use to carry traffic during normal operations of the network or redesignating a spare segment to be a traffic segment. The delete traffic segment topology change includes removing a network segment that was previously designated for use to carry traffic during normal operations of the network or redesignating a traffic segment to be a spare segment.

After receiving the indication of the topology change, the update manager validates the topology change (step 504). In this step, the update manager queries the network nodes to actually determine whether the indicated change has occurred. For example, if the topology change were the addition of a node X, the update manager in this step attempts to communicate with node X via the X.25 connection to node X to determine if it was actually incorporated as part of the network. The next step performed during plan regeneration is that the real-time plan generator receives an indication of the topology change from the update manager and determines whether the topology change is the addition of one or more spare segments (step 506). If a spare segment has been added, the real-time plan generator prompts the user to confirm whether all plans should be regenerated (step 507). It may be necessary to regenerate all plans when a spare segment is added to the network, because it is difficult to determine which plans would be positively affected by the addition of a spare segment. That is, the spare segment may provide a better path for rerouting traffic around a number of network components.

After prompting the user, the real-time plan generator determines whether the user has indicated to regenerate all plans or whether the topology changes exceed a threshold (step 508). This threshold is a predetermined number of spare segments that the network administrator defines, so that a complete plan regeneration only occurs when enough spare segments have been added to warrant the complete plan regeneration. If either of these conditions are true, the real-time plan generator regenerates all plans for all network components (step 510). When regenerating all plans, the real-time plan generator accesses the plan database to retrieve all plans, and for each plan, the real-time plan generator accesses the RTT to determine all alternative routes based on the current topology information. The real-time plan generator then chooses a best route based on a number of factors, such as distance, capacity, and current traffic. After regenerating all plans, processing continues to step 502 to wait for another topology change.

If it is determined that a spare has not been added, the real-time plan generator counts the total number of instructions in all plans as well as the number of instructions affected by the topology change (step 512). In this step, the real-time plan generator accesses all plans in the plan database and counts the number of instructions. Additionally, within these instructions, the real-time plan generator identifies the instructions that are affected by the topology change. For example, if the topology change were to remove a node X, the real-time plan generator identifies all instructions that refer to node X. Next, the real-time plan generator counts all plans that have been affected by the topology change as well as the total number of plans in the plan database (step 514). An "affected" plan is a plan that contains an affected instruction. After counting the affected plans and the total plans, the real-time plan generator accesses a user-defined threshold (step 516). In an exemplary embodiment of the present invention, the network administrator may define a number of different thresholds that, when exceeded, trigger the regeneration of the affected plans. This processing is performed so as to allow the user to optimize when regeneration occurs so as to optimize the use of system resources. In an exemplary embodiment, the real-time plan generator determines (1) if the mean percentage plan error is greater than the threshold for plan error percentage or (2) if the number of affected plans is greater than the threshold for the number of affected plans. The mean percentage plan error is the number of affected instructions divided by the total number of instructions, and the plan error percentage is a user-defined threshold. It may be appreciated that a percentage of affected plans, which is the affected plans divided by total plans, may also be used as a threshold. If either of these thresholds has been exceeded (step 518), the real-time plan generator regenerates the affected plans (step 520). In this step, through the help of the network administrator, the system identifies the best alternative routes for each network component associated with the affected plans. If the threshold has not been exceeded or after regenerating the affected plans, processing continues to step 502.

One skilled in the art will appreciate that various alternatives to the plan regeneration of an exemplary embodiment may be employed. For example, during plan regeneration, instead of using a user-defined threshold, an alternative embodiment may work on a continual basis, updating the affected plans upon every topology change. Additionally, an alternative embodiment may provide a feature that allows the user to immediately jump to step 510 of FIG. 5 to regenerate all plans in the plan database.

While the present invention has been described with reference to a preferred embodiment thereof, those skilled in the art will know of various changes in form and detail that may be made without departing from the spirit and scope of the present invention as defined in the appended claims.

What is claimed is:

1. A method in a data processing system having a network restoration system with plans for rerouting traffic in a network around a network failure, the method performed by the network restoration system, comprising the steps of:

determining whether a topology of the network has changed; and when it is determined that the topology has changed, regenerating at least one of the plans, utilizing a topology database having topology information, responsive to the determination that the topology of the network has changed, wherein the step of determining includes identifying plans affected by the topology change, and wherein the step of regenerating is performed responsive to determining that the number of the affected plans exceeds a predetermined threshold.

2. The method of claim 1 wherein the step of determining includes determining whether the topology of the network has changed more than a predetermined number of times and wherein the step of regenerating is performed responsive to determining that the topology of the network has changed for more than the predetermined number of times.

3. The method of claim 1, further including the step of, when it is determined that the topology has changed, identifying an affected plan, wherein the affected plan is a plan that is affected by the topology change, and wherein the step of regenerating includes regenerating the affected plan.

4. The method of claim 1, further including the step of, when it is determined that the topology has changed, identifying affected plans, wherein the affected plans are plans that are affected by the topology change, and wherein the step of regenerating includes regenerating all of the affected plans.

5. The method of claim 1 wherein the step of determining whether a topology of the network has changed includes determining that the topology of the network has changed when a network segment to be used for network traffic during normal operations of the network has been removed from the network.

6. The method of claim 1 wherein each of the plans contain instructions for rerouting the traffic around a component causing the network failure, wherein the step of determining includes identifying affected instructions which are instructions in the plans that are affected by the topology change, and wherein the step of regenerating is performed responsive to determining that a total number of the affected instructions exceeds a predetermined threshold.

7. The method of claim 1 wherein the step of determining includes identifying affected plans which are plans that are affected by the topology change, and wherein the step of regenerating is performed responsive to determining that a ratio between a total number of the affected plans and a total number of the plans is within a predetermined range.

8. The method of claim 1 wherein each of the plans contain instructions for rerouting the traffic around a component causing the network failure, wherein the step of determining includes identifying affected instructions, which are instructions in the plans that are affected by the topology change, and wherein the step of regenerating is performed responsive to determining that a ratio between a total number of the affected instructions and a total number of the instructions in the plans is within a predefined range.

9. The method of claim 1 wherein the step of determining whether a topology of the network has changed includes determining that the topology of the network has changed when a spare network segment has been added to the network.

10. The method of claim 1 wherein the step of determining whether a topology of the network has changed includes determining that the topology of the network has changed when a spare network segment has been removed from the network.

11. The method of claim 1 wherein the step of determining whether a topology of the network has changed includes determining that the topology of the network has changed when a network segment to be used for network traffic during normal operations of the network has been added to the network.

12. A data processing system for managing restoration of a network having a topology, the data processing system comprising:
   a secondary storage device containing a plurality of plans for use in rerouting network traffic when a network failure occurs and a topology database containing topology information indicating the topology of the network;
   a memory containing:
      an update manager for determining when the topology of the network has changed; and
      a restoration manager for receiving an indication that the topology of the network has changed from the update manager, for determining which of the plans are affected plans, wherein the affected plans are plans that are affected by the topology change, and for regenerating the affected plans utilizing the topology information in the topology database; and
   a processor for running the update manager and the restoration manager.

13. The data processing system of claim 12 wherein each of the plans contain instructions for rerouting the network traffic, wherein the restoration manager determines affected instructions which are instructions in the plans that are affected by the topology change, and wherein the restoration manager regenerates the affected plans responsive to determining that a ratio between a total number of the affected instructions and a total number of the instructions in the plans is within a predefined range.

14. The data processing system of claim 12 wherein the restoration manager determines whether the topology of the network has changed more than a predetermined number of times and wherein the restoration manager regenerates the affected plans responsive to determining that the topology of the network has changed for more than the predetermined number of times.

15. The data processing system of claim 12 wherein the restoration manager determines affected plans which are plans that are affected by the topology change and wherein the restoration manager regenerates the affected plans responsive to determining that a total number of the affected plans exceeds a predetermined number.

16. The data processing system of claim 12 wherein each of the plans contain instructions for rerouting the network traffic when a network failure occurs, wherein the restoration manager determines affected instructions which are instructions in the plans that are affected by the topology change, and wherein the restoration manager regenerates the plans responsive to determining that a total number of the affected instructions exceeds a predetermined number.

17. The data processing system of claim 12 wherein the restoration manager determines affected plans which are plans that are affected by the topology change, and wherein the restoration manager regenerates the affected plans responsive to determining that a ratio between a total number of the affected plans and a total number of the plans is within a predetermined range.

18. A computer-readable medium whose contents cause a data processing system to perform a method, the data processing system having a network restoration system with plans for rerouting traffic in a network around a network failure, the method performed by the network restoration system, comprising the steps of:
   determining whether a topology of the network has changed; and
   when it is determined that the topology has changed, regenerating at least one of the plans, utilizing a topology database having topology information, responsive to the determination that the topology of the network has changed, wherein the step of determining includes identifying plans affected by the topology change, and wherein the step of regenerating is performed responsive to determining that the number of the affected plans exceeds a predetermined threshold.

19. The computer-readable medium of claim 18 wherein each of the plans contain instructions for rerouting the traffic around a component causing the network failure, wherein the step of determining includes identifying affected instructions, which are instructions in the plans that are affected by the topology change, and wherein the step of regenerating is performed responsive to determining that a ratio between a total number of the affected instructions and a total number of the instructions in the plans is within a predefined range.

20. The computer-readable medium of claim 18 wherein the step of determining includes determining whether the topology of the network has changed more than a predetermined number of times and wherein the step of regenerating is performed responsive to determining that the topology of the network has changed for more than the predetermined number of times.

21. The computer-readable medium of claim 18, further including the step of, when it is determined that the topology has changed, identifying an affected plan, wherein the affected plan is a plan that is affected by the topology change, and wherein the step of regenerating includes regenerating the affected plan.

22. The computer-readable medium of claim 18, further including the step of, when it is determined that the topology has changed, identifying affected plans, wherein the affected plans are plans that are affected by the topology change, and wherein the step of regenerating includes regenerating all of the affected plans.

23. The computer-readable medium of claim 18 wherein the step of determining includes identifying affected plans which are plans that are affected by the topology change, and wherein the step of regenerating is performed responsive to determining that a ratio between a total number of the affected plans and a total number of the plans is within a predetermined range.

24. The computer-readable medium of claim 18 wherein each of the plans contain instructions for rerouting the traffic around a component causing the network failure, wherein the step of determining includes identifying affected instructions which are instructions in the plans that are affected by the topology change, and wherein the step of regenerating is performed responsive to determining that a total number of the affected instructions exceeds a predetermined threshold.

* * * * *